UNITED STATES PATENT OFFICE.

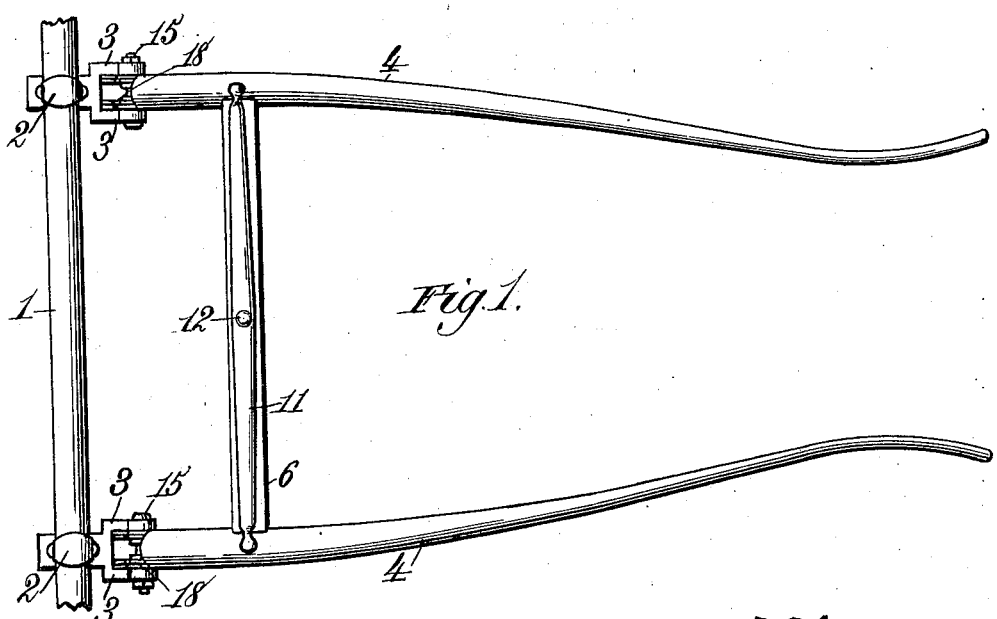

THOMAS J. PETERS, OF OWINGSVILLE, KENTUCKY.

VEHICLE POLE OR SHAFT.

SPECIFICATION forming part of Letters Patent No. 674,281, dated May 14, 1901.

Application filed November 1, 1900. Serial No. 35,148. (No model.)

*To all whom it may concern:*

Be it known that I, THOMAS J. PETERS, a citizen of the United States, residing at Owingsville, in the county of Bath and State of Kentucky, have invented new and useful Improvements in Hollow Shafts and Poles for Vehicles and Supports Therefor, of which the following is a specification.

This invention relates to hollow shafts and poles for vehicles and supports therefor, and has for its principal object to provide certain improvements in the construction of such shafts and in their connecting cross-bar, whereby said parts are greatly strengthened and have imparted thereto the desirable qualities of durability and lightness.

Another object of the invention is to provide an improved connection between the hollow shafts and the axle-clips in such manner as to prevent rattling at that point.

The invention consists in features of construction and novel combinations of parts, as hereinafter more particularly set forth.

In the annexed drawings, Figure 1 is a plan of my invention. Fig. 2 is an enlarged partial plan view of a portion of the same, with one of the hollow thills or shafts and one end portion of the connecting cross-bar in section. Fig. 3 is a view in front elevation, with the shafts and a portion of their connecting cross-bar in vertical section. Fig. 4 shows a portion of a hollow shaft or thill in part side elevation and part longitudinal section, with the connecting cross-bar in vertical transverse section, and showing also the connection between the hollow shaft or thill and the axle-clip. Fig. 5 is an enlarged perspective of one end portion of a channeled or hollow cross-bar connecting the hollow thills. Fig. 6 is a view of an antirattler and shaft support.

Referring to the drawings, the numeral 1 designates a vehicle-axle, and 2 the axle-clips, having forwardly-projecting ears 3 of any suitable construction.

The shafts or thills 4 are made hollow and are constructed from rolled metal and are of any desirable shape or configuration. These hollow thills may be made from rolled steel, wrought-iron, malleable iron, or other metal, as preferred. The seam in each hollow shaft is on its under side, as shown in Figs. 2 and 3, and is made by forming the longitudinal edges of the rolled metal with inwardly-turned flanges 5, that are sprung together within the tubular shaft, or the seam may be secured in any other suitable manner.

Toward their rear ends the hollow shafts 4 are securely connected and braced by means of a hollow cross-bar or inverted channel-iron 6, which also provides a point of attachment for the whiffletree. This cross-bar or channel-iron 6 may be made, like the thills, from rolled steel, wrought-iron, malleable iron, or any other suitable metal for the sake of lightness, durability, and strength. By referring to Figs. 3 and 4 it will be seen that this cross-bar 6 may be open along its under side. Each end portion of the top of said bar is turned downward to form a flange 7, Figs. 2, 3, and 5, and the front and rear walls of said bar have their end portions bent rearwardly and forwardly, respectively, to form abutting flanges 8 on the outer side of each downwardly-flanged portion 7, as shown. In the abutting flanges 8 there are provided holes 9, Fig. 5, for passage of bolts or rivets 10, Figs. 2 and 3, that secure the said cross-bar or channel-iron 6 to and between the two hollow thills.

The whiffletree 11 may be mounted either above or below the cross-bar 6 by means of a pivot-bolt 12, Fig. 3, that may have a bearing in a bracket or strap 13, securely bolted to the under side of the top portion of the channeled cross-bar.

At their rear ends the hollow thills or shafts 4 may be partly cut away to provide ears 14, through which the said shafts or thills are connected with the ears 3 of the axle-clips by means of thill pins or pivots 15, Figs. 1 and 4. Each hollow thill or shaft is provided with an antirattler thill-support, Figs. 4 and 6, consisting, preferably, of a spring-rod so bent as to form at one end a tongue 16, that is inserted into the rear open end of the tubular shaft, the said tongue having integral therewith coils 17, through which the thill pins or pivots 15 are passed. The tongue portion 16 of this antirattler and also its coils 17 are integral with suitably-curved spring end portions 18, that occupy a position intermediate the axle-clips and the thill ends when said thills and axle-clips are connected, as described. By this construction an antirattling connection is provided between the axle-clips and the hollow thills.

Obviously the described construction of hollow shafts or thills is applicable as well to hollow poles for wagons or other vehicles, and it will be readily understood that the manner of forming the seam therein by means of the inwardly-sprung and closely-parallel flanges 5 will impart great strength and durability of structure, together with a neat and workmanlike appearance.

The hollow shafts or hollow pole can be substantially circular in cross-section or may have a rectangular or other polygonal cross-section, as may be desired. The internal rib that is provided in the hollow thill or pole and which is formed by the described inwardly-sprung seam-flanges 5 may extend the entire length of the thill or pole, thereby imparting requisite strength and a suitable degree of rigidity, but without impairing the desirable lightness and elasticity of the hollow shaft or pole.

What I claim as my invention is—

1. A hollow metal thill or pole for vehicles, having ears on its rear end, in combination with the ears of an axle-clip, and a thill-support inserted into the rear end portion of said hollow thill or pole and provided with openings for passage of a thill pin or pivot, that also engages the ears of the axle-clip and hollow thill or pole, substantially as described.

2. The combination of a hollow metal thill or pole for vehicles, an axle-clip, a support inserted into the rear end portion of said hollow thill or pole, and a thill pin or pivot by which the axle-clip and the hollow thill or pole and its said support are connected, substantially as described.

3. The combination of a hollow metal thill or pole for vehicles, an axle-clip, an antirattler-support inserted into the rear end portion of said hollow thill or pole, and a pin or pivot connecting the said thill or pole and its said support with the axle-clip, substantially as described.

4. The combination of a hollow metal thill or pole for vehicles, having its rear end provided with ears, an axle-clip provided with ears, and an antirattler-support having one end inserted into the rear end portion of the hollow thill or pole and provided with coiled portions for embracing a thill pin or pivot and with a spring end portion intermediate said pin or pivot and the axle-clip, substantially as described.

5. The combination with the hollow metal vehicle-shafts, of a hollow metal cross-bar having its top portion formed with downwardly-turned end flanges and its front and rear walls formed, respectively, with rearwardly and forwardly turned flanges abutting each other, and bolts or rivets connecting the said flange portions of said thill metal cross-bar with the said hollow metal shafts, substantially as described.

6. The combination with the hollow metal vehicle-shafts, of a hollow metal cross-bar consisting of an inverted channel-iron having its top wall provided with downwardly-turned flanges and its front and rear walls provided with abutting end flanges lapped over the downwardly-turned flanges of the upper wall, thereby providing bearings for the hollow metal shafts between which said hollow metal cross-bar is placed, and bolts or rivets passed through said flanged end portions of said hollow metal cross-bar and connecting the same with said hollow metal shafts, substantially as described.

7. The combination with the hollow metal vehicle-shafts, of a hollow metal cross-bar extended between said shafts and consisting of an inverted channel-iron having end flanges through which it is connected with said hollow metal shafts, and a whiffletree carried on said hollow metal cross-bar, substantially as described.

In testimony whereof I have hereunto set my hand in presence of two subscribing witnesses.

THOMAS J. PETERS.

Witnesses:
GEO. E. SULLIVAN,
GEO. W. REA.